United States Patent
Dundas et al.

(10) Patent No.: US 11,113,063 B2
(45) Date of Patent: Sep. 7, 2021

(54) METHOD AND APPARATUS TO CONTROL THE USE OF HIERARCHICAL BRANCH PREDICTORS BASED ON THE EFFECTIVENESS OF THEIR RESULTS

(71) Applicant: Samsung Electronics Co., Ltd., Suwon-si (KR)

(72) Inventors: James David Dundas, Austin, TX (US); Xiaoxin Fan, Austin, TX (US); Shashank Nemawarkar, Austin, TX (US); Madhu Saravana Sibi Govindan, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/565,476

(22) Filed: Sep. 9, 2019

(65) Prior Publication Data

US 2020/0401409 A1    Dec. 24, 2020

Related U.S. Application Data

(60) Provisional application No. 62/865,943, filed on Jun. 24, 2019.

(51) Int. Cl.
*G06F 9/32* (2018.01)
*G06F 9/34* (2018.01)
(Continued)

(52) U.S. Cl.
CPC ............ *G06F 9/3806* (2013.01); *G06F 9/381* (2013.01); *H04L 9/0643* (2013.01); *G06F 9/44* (2013.01);
(Continued)

(58) Field of Classification Search
CPC ...... G06F 9/3806; G06F 9/381; G06F 9/3842; G06F 9/3844; G06F 9/3846;
(Continued)

(56) References Cited

U.S. PATENT DOCUMENTS

| 6,029,228 A * | 2/2000 | Cai ..................... G06F 9/30174 711/137 |
| 2001/0021974 A1* | 9/2001 | Lee ....................... G06F 9/3851 712/240 |

(Continued)

*Primary Examiner* — Daniel H Pan
(74) *Attorney, Agent, or Firm* — Renaissance IP Law Group LLP

(57) ABSTRACT

According to one general aspect, an apparatus may include a main-branch target buffer (BTB). The apparatus may include a micro-BTB separate from and smaller than the main-BTB, and configured to produce prediction information associated with a branching instruction. The apparatus may include a micro-BTB confidence counter configured to measure a correctness of the prediction information produced by the micro-BTB. The apparatus may further include a micro-BTB misprediction rate counter configured to measure a rate of mispredictions produced by the micro-BTB. The apparatus may also include a micro-BTB enablement circuit configured to enable a usage of the micro-BTB's prediction information, based, at least in part, upon the values of the micro-BTB confidence counter and the micro-BTB misprediction rate counter.

18 Claims, 4 Drawing Sheets

(51) Int. Cl.
  *G06F 9/38*      (2018.01)
  *H04L 9/06*      (2006.01)
  *G06F 12/1027*   (2016.01)
  *G06F 9/44*      (2018.01)
  *G06F 9/46*      (2006.01)

(52) U.S. Cl.
  CPC ............ *G06F 9/46* (2013.01); *G06F 12/1027* (2013.01); *G06F 2212/1021* (2013.01)

(58) Field of Classification Search
  CPC .............. G06F 9/3848; G06F 12/1027; G06F 2212/1021; H04L 9/0643
  USPC ................................................ 712/238–240
  See application file for complete search history.

(56) References Cited

U.S. PATENT DOCUMENTS

| | | | |
|---|---|---|---|
| 2003/0212882 A1* | 11/2003 | Bonanno | G06F 9/322 |
| | | | 712/238 |
| 2007/0239974 A1* | 10/2007 | Park, II | G06F 9/3848 |
| | | | 712/238 |
| 2017/0068539 A1 | 3/2017 | Dundas et al. | |
| 2017/0139717 A1 | 5/2017 | Hornung et al. | |
| 2018/0121203 A1 | 5/2018 | Ishii et al. | |

* cited by examiner

100

METHOD AND APPARATUS TO CONTROL THE USE OF HIERARCHICAL BRANCH PREDICTORS BASED ON THE EFFECTIVENESS OF THEIR RESULTS

CROSS-REFERENCE TO RELATED APPLICATION

This application claims priority under 35 U.S.C. § 119 to Provisional Patent Application Ser. No. 62/865,943, entitled "METHOD AND APPARATUS TO CONTROL THE USE OF HIERARCHICAL BRANCH PREDICTORS BASED ON THE EFFECTIVENESS OF THEIR RESULTS" filed on Jun. 24, 2019. The subject matter of this earlier filed application is hereby incorporated by reference.

TECHNICAL FIELD

This description relates to computer architecture, and more specifically to a method and apparatus to control the use of hierarchical branch predictors based on the effectiveness of their results.

BACKGROUND

Central processing units (CPUs) normally predict the direction and target of branch instructions early in a processing pipeline in order to boost performance. Information about the type, location, and target of a branch instruction is typically cached in a branch target buffer (BTB), which is accessed using an instruction fetch address, and uses a content addressable memory (CAM) to detect if the BTB contains a branch that maps to the current fetch window. A BTB can also use a set associative structure to detect whether the BTB contains a branch that maps to the current fetch window. A conventional BTB is typically a large structure, and when combined with a branch direction predictor, results in at least a one cycle penalty (i.e., a bubble) for a predicted-taken branch. In some cases, the conventional BTB may even incur a penalty for a predicted not-taken branch.

Some attempts have been made to address the penalty by using a loop buffer or similar structure to hide the predicted-taken branch bubble, but these approaches have limitations. Loop buffers require that all of the instructions in the loop fit within the loop buffer, not just the branch instructions. Smaller and simpler BTBs that do not incorporate a conditional branch predictor cannot accurately predict branches with dynamic outcomes and will result in wasted performance and energy. Furthermore, smaller and simpler BTBs that do not employ links will waste energy on CAM operations.

SUMMARY

According to one general aspect, an apparatus may include a main-branch target buffer (BTB). The apparatus may include a micro-BTB separate from and smaller than the main-BTB, and configured to produce prediction information associated with a branching instruction. The apparatus may include a micro-BTB confidence counter configured to measure a correctness of the prediction information produced by the micro-BTB. The apparatus may further include a micro-BTB misprediction rate counter configured to measure a rate of mispredictions produced by the micro-BTB. The apparatus may also include a micro-BTB enablement circuit configured to enable a usage of the micro-BTB's prediction information, based, at least in part, upon the values of the micro-BTB confidence counter and the micro-BTB misprediction rate counter.

According to another general aspect, an apparatus may include a main-branch target buffer (BTB). The apparatus may include a micro-BTB separate from and smaller than the main-BTB, and configured to produce prediction information associated with a branching instruction. The apparatus may include a main-BTB confidence counter configured to measure a correctness of the prediction information produced by the main-BTB. The apparatus may include a main-BTB misprediction rate counter configured to measure a rate of mispredictions produced by the micro-BTB. The apparatus may include a micro-BTB enablement circuit configured to enable a usage of the micro-BTB's prediction information, based, at least in part, upon the values of the main-BTB confidence counter and the main-BTB misprediction rate counter.

According to another general aspect, a system may include a front-end logic section configured to fetch and predict a series of instructions to be executed. The front-end logic section may include a main-branch target buffer (BTB). The front-end logic section may include a micro-BTB separate from and smaller than the main-BTB, and configured to produce prediction information associated with a branching instruction. The system may include a heuristic logic circuit comprising a plurality of counters configured to measure the effectiveness of the main-BTB and the micro-BTB, and based, at least in part, upon plurality of counters, determine whether to enable a usage of the micro-BTB's prediction information.

The details of one or more implementations are set forth in the accompanying drawings and the description below. Other features will be apparent from the description and drawings, and from the claims.

A system and/or method for computer architecture, and more specifically to a method and apparatus to control the use of hierarchical branch predictors based on the effectiveness of their results, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
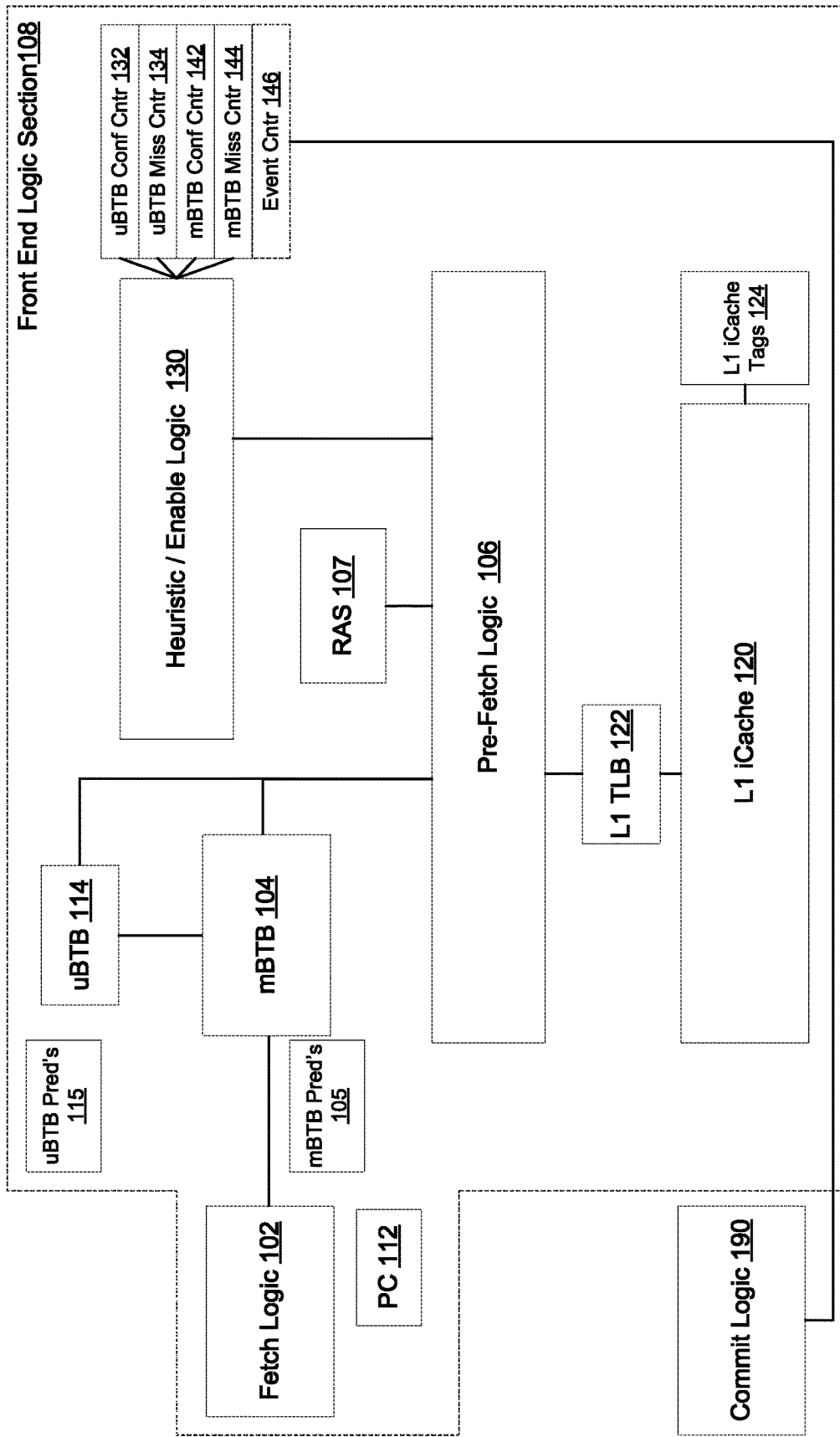
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a computing device, such as, for example, a processor, system-on-a-chip (SoC), laptop, desktop, workstation, personal digital assistant, smartphone, tablet, and other appropriate computers or a virtual machine or virtual computing device thereof. In various embodiments, the system 100 may employ a pipelined architecture including various pipeline stages.

In such an embodiment, part of the pipeline may include a fetch logic circuit 102 configured to fetch instructions, which are in turn processed by the system 100. The current (for at least that pipe stage) instruction may be held or referenced in a program counter (PC) 112. Generally, as instructions, one after the other, are sequentially fetched, the PC 112 is incremented. However, occasionally, the program does not advance sequentially but jumps or branches to a new location. Traditionally, the usual types of branch instructions include IF statements, Loops, subroutines calls or returns, and so on. Essentially the program reaches a fork in the road of execution and has to decide which path to take.

Because of the pipelined nature of the system 100 this can be very costly. Does the program continue the loop or break out of it? Is the IF statement true or false? These options are generally referred to as the branch being Taken or Not taken. The system 100 could halt all execution until the branch instruction is resolved. However, it is more advantageous for the system 100 to predict how the branch instruction will resolve and then speculatively execute the predicted path. If the prediction is correct, then the system 100 has not wasted anytime. Otherwise, the system 100 has to invalidate all of its speculative work, rewind the machine to the incorrectly predicted branch instruction and proceed down the other execution path. As a result, there is a great need to increase prediction accuracy.

One technique for doing this is a branch target buffer (BTB). A BTB is a memory that is addressable by instruction address (usually the current PC 112) and recounts the way the branch instruction resolved the last time the branch instruction was encountered (either as taken/not taken, or as the target address of the branch). This way the front end logic circuits or section 108 can quickly predict the branch instruction's resolution and proceed.

In the illustrated embodiment, the system 100 may include a main BTB (mBTB) 104 that is generally sized to accommodate a relatively large number of possible addresses (branch instructions) and still be able to return a desired prediction in a relatively quick period of time. In various embodiments, the size may differ, but the general tradeoff between speed and size is understood. As described above, the mBTB 104 may include a table or data structure that includes the address of the branch instruction, the address of the target instruction, and a valid bit or flag. In such an embodiment, the valid bit or flag may indicate that data has been explicitly written into the mBTB 104 and it should be treated as acceptable to use. The valid bit differentiates valid data (which can be relied upon to have meaning) from invalid data (which is assumed to have no meaning; e.g., from an old program run, random bits not reset from system start-up).

The fetch logic 102 or the pre-fetch logic 106 may then fetch or retrieve the target instruction indicated by the mBTB 104. In various embodiments, this may involve requesting the target instruction from a cache, such as the level-1 (L1) instruction cache (i-cache or iCache) 120, which is configured to store instructions. In such an embodiment, the L1 iCache may include a series of tags 124 and be associated with a L1 translation look-aside buffer (TLB) 122. In various embodiments, other or multiple cache levels may be used. It is understood that the above is merely one illustrative example to which the disclosed subject matter is not limited.

Further, in the illustrated embodiment, the system 100 may include a return address stack (RAS) 107 for branch instructions that include a subroutine call. When a subroutine call occurs the return address of the subroutine may be pushed onto the stack 107. When the subroutine is complete and returns (via another branch instruction) that return address may be popped off the stack and used as the target address.

In the illustrated embodiment, a micro-BTB (uBTB or μBTB) 114 may be employed. A uBTB 114 may differ from the traditional mBTB 104 mainly in terms of size. In such an embodiment, the uBTB 114 may offer quicker performance as there are less entries to search through. In such an embodiment, the uBTB 114 may be primarily employed for kernels of instructions with a limited number of instructions that repeat or are more generally predictable. In various embodiments, this may include loops that can be captured in a small loop buffer.

In such an embodiment, the uBTB 114 may include a BTB that is smaller than the mBTB 104, and therefore may be faster and consume less power. In the illustrated embodiment, the uBTB 114 may provide prediction information which can be received by the front end logic section 108 of the system 100. When the information (specifically the prediction information) from the uBTB 114 has been verified as correct, portions of the front end logic section 108 may be powered down, and the uBTB 114 may be relied upon to predict the target instructions. In various embodiments, the portions that may be powered down may include the TLB 122, the L1 instruction cache full-tag or micro-tag arrays 124, the tag comparison logic or the branch target address verification logic 106, the mBTB 104, main conditional predictor 105, and/or the RAS 107. In another embodiment, only the L1 instruction cache way predicted by the way prediction logic may be powered up. It is understood that the above are merely a few illustrative examples to which the disclosed subject matter is not limited.

In one specific embodiment, the uBTB 114 may include 128 entries. In such an embodiment, the disclosed subject matter may cover program kernels that fill an entire 64 kilobyte instruction cache, if the basic blocks covered by the uBTB 114 are large enough, and the uBTB 114 is able to correctly predict all the branches within a program kernel. In such an embodiment, this may include program kernels with sophisticated branching patterns, dynamic indirect branches, conditional branches, and subroutine calls and returns, as described below.

In various embodiments, the penalty for a misprediction by the uBTB 114 may be undesirably high. For example, in various embodiments, the mBTB 104 and the main conditional predictor 105 may have been powered down due to high uBTB confidence, in which case a backend redirect may be required which is very expensive, on the order of 15 cycles vs a mBTB redirect of uBTB which may be a 2 cycle penalty). If the uBTB 114 accuracy or coverage is too low the front-end 108 may have to redirect the fetch command in order to restart it with the mBTB 104. In addition to the cost of switching power modes, this may introduce bubbles or NOOPs, periods of inactivity, to the system 100's pipeline. These bubbles would not exist if the uBTB 114 had not been enabled in the first place.

In some embodiments, the uBTB 114 spends time training or locking-on to a prediction scheme or set of predictions. In various embodiments, this time to lock-on may disable (temporarily) low-latency predictors 115, such as, for example, Zero-Cycle Always Taken (ZAT) or Zero-Cycle Often Taken (ZOT). This reduces performance by essentially stalling instruction fetch in an attempt to allow the uBTB 114 to train. In various embodiments, the uBTB 114 may train itself offline at commit time.

As briefly mentioned, the uBTB 114 may be associated with a plurality or number of predictors or prediction techniques 115. For examples, but not limited to a uBTB loop/antiloop predictor and/or a uBTB non-loop conditional predictor. Likewise, the mBTB may be associated with its own predictors or prediction schemes 105. In various embodiments, the mBTB predictors may include a predictor that predicts branch directions for conditional branches tracked by mBTB 104. As discussed below, these predictors 115 and 105 may be turned on or off independently, and may even overlap. In some embodiments, the system 100 may be configured to allow testing of the predictors in order to determine which ones are effective and accurate and which ones are not.

In the illustrated embodiment, the system 100 may include a heuristic or enabling logic circuit 130. In such an embodiment, the enabling logic 130 may be configured to determine if the uBTB 114 is performing poorly (or well) and enabling/disabling the uBTB 114 in favor of the mBTB 104. In some embodiments disabling the uBTB 114 may include powering the uBTB 114 down. However, in another embodiment, disabling may simply include preventing the prediction results of the uBTB 114 from being used. That is, the uBTB 114 and mBTB 104 may both perform prediction duties, but that only the mBTB 104's predictions may be used. In such an embodiment, the uBTB 114 may be given time to train or lock-on to a prediction scheme without negatively impacting the system 100, as described above.

In such an embodiment, the enabling logic 130 may be configured to continuously monitor and evaluate the performance of the uBTB 114. The enabling logic 130 may compare the accuracy (or other metrics) of the uBTB 114 to the mBTB 104 and then determine which is more accurate. The enabling logic 130 may then enable usage of the predictions of the more accurate BTB. Thus, may power and time be saved.

In the illustrated embodiment, the system 100 may include a number of counters or other measuring circuits 132, 134, 142, 144, and 146. In this one embodiment, the enabling logic 130 may measure the accuracy of the uBTB 114 and mBTB 104 via the confidence counters 132 and 142, and measure the rate of misprediction via the uBTB and mBTB misprediction counters 134 and 144. As described below further activity of the enabling logic 130 may be controlled by various events, measured by the event counter(s) 146.

In various embodiments, the enabling logic 130 may measure when the uBTB 114 and mBTB 104 (or more accurately the predictors 115 and 105, respectively) correctly predict which way the branch goes. This may be done during the commit phase of the pipeline stages. In the illustrated embodiment, the system 100 may include commit logic circuits 190 that determine if a speculatively executed instruction should have been executed or not. If so, the results of the instructions processing are committed to and the system 100 moves on. In the case of a branch, the commit logic 190 determines if the branch was predicted correctly or not. This data is then fed back to the front end 108 where the enabling logic 130 (or other circuit) compares the committed branch to the prediction and determines the accuracy of the prediction.

Both confidence counters 132 and 142 may be updated after a branch instruction commits. The uBTB confidence counter 132 may be compared to the uBTB 114's prediction. This may be done even if the uBTB 114's predictions are not actually used, allowing the uBTB 114 to train and have its performance evaluated without negatively impacting the system 100. Likewise, the mBTB confidence counter 142 may be compared to the mBTB's predictions.

In various embodiments, the counters 132 and 142 may include thermometer weighted counters. In such an embodiment, if either counter saturates or reaches a threshold value then both may be reset, or in the case of one embodiment be divided by 2.

In the illustrated embodiment, one of the predictors 115 employed by the uBTB 114 may include a hash tag predictor. In various embodiments, this may be a version of a hashed conditional branch predictor that uses a single branch's history of directions (e.g., taken/not taken) to predict that branch's next direction. Likewise, the mBTB 104 may include a predictor 105 that includes a different or similar hash-tagged predictor to predict conditional branch directions. In some embodiments, the mBTB's hash tagged may use a longer history that is composed of outcomes from all or many branches. The uBTB 114 may employ a smaller predictor for size and timing reasons.

In various embodiments, the front-end 108 may include counters that measures the accuracy of the uBTB's and/or mBTB predictions, or other prediction schemes. The mBTB prediction counter (represented by or in some embodiments equivalent to the mBTB confidence counter 142) may be a 7-bit counter that tracks the confidence of the mBTB predictions versus the uBTB predictions. If the mBTB prediction counter is lower than the uBTB confidence counter 132, the enabling logic 146 may feel that the uBTB 114 is a better predictor than the mBTB 104.

An example set or rules for updating the mBTB confidence counter 142 are given below. The term "uBTBCtr" refers to the uBTB confidence counter 132. The term "mBTBPCtr" refers to the mBTB predictions or mBTB confidence counter 142.

```
If (uBTBCtr == 127 || mBTBCtr == 127):
    //divide both counters by 2 if either saturates at a maximum value
    uBTBCtr >>=1; mBTBCtr >>= 1;
Else If branch is graph miss at commit time:
    // hold the mBTB confidence value if the uBTB does not have branch
    mBTBCtr = mBTBCtr;
Else if main predictor correctly predicts taken:
    //increment mBTB predictor confidence on correctly predicted taken branch
    mBTBCtr = mBTBCtr+1;
Else:
    // saturates at -2 because in one embodiment the mBTB predictor inserts
two bubbles to redirect fetch vs uBTB zero bubbles)
    mBTBCtr = mBTBCtr - 2;
```

It is understood that the above is merely one illustrative example to which the disclosed subject matter is not limited.

An example set or rules for updating the uBTB confidence counter 132 are given below. The term "uBTBCtr" refers to the uBTB confidence counter 132. The term "mBTBCtr" refers to the mBTB predictor or mBTB confidence counter 142. "T" refers to Taken branches. And, "NT" to Not Taken branches.

```
If (uBTBCtr == 127 || mBTBCtr == 127)
    // divide both counters by 2 if either saturates at a maximum value
    uBTBCtr >>=1; mBTBCtr >>= 1;
Else If branch is graph miss at commit time:
```

```
        // hold uBTB predictor confidence value if uBTB does not have branch
        uBTBCtr = uBTBCtr ;
    Else:
        //branch exists in the uBTB (measure accuracy using commit logic that does
not impact fetch)
        if the uBTB predictor Branch && predicted outcome == actual outcome
&& uBTB predictor Confidence[3:0] == 15:
            //increment on correct uBTB predictor highest confidence
prediction
            uBTBCtr++;
    Else if Loop/Antiloop branch:
        // (loop/antiloop) = repeating cadence of (T/N) followed by a single
(N/T)
        if cadence >= 32 && confidence >= 7 or
        cadence >= 8 && confidence >= 11 or
        cadence >= 4 && confidence >= 12 or
        cadence >= 2 && confidence >= 13 or
        cadence >= 1 && confidence >= 14:
            uBTBCtr++; //saturates at 127
    Else if highly biased T or always-T branch:
        uBTBCtr++; // saturates at 127
    Else if highly biased N or always-N branch:
        uBTBCtr++; //saturates at 127
    Else:
        uBTBCtr = uBTBCtr; //hold value
```

It is understood that the above is merely one illustrative example to which the disclosed subject matter is not limited.

These two confidence counters 132 and 142 may then be compared. In some embodiments, if the uBTB confidence counter 132 is greater then or equal to the mBTB confidence counter 142, the uBTB 114 may be enabled and allowed to actually make predictions or more accurately have its predictions be used by the front end 106. In another embodiment, the enabling of the uBTB 114 may also have to pass a second test. The enabling logic 140 may determine whether or not the uBTB 114 has a misprediction rate lower than the mBTB 104. In the illustrated embodiment, the misprediction rate may be measured as the number of misprediction per thousand branches (MPK). It is understood this is merely one example to which the disclosed subject matter is not limited.

In one embodiment, the misprediction rates may be compared every 256 branches (or at other increments: e.g., 1024 branches, 256 clock cycles, 256 retired instructions, etc.)

An example set of rules for updating the uBTB misprediction rate counter 134 is given below.

```
If 256 branches have committed:
    clear the uBTB misprediction counter
Else if the uBTB misprediction counter saturates at its maximum value:
    keep the counter at its maximum value
Else if the uBTB did not make a commit time prediction due to the uBTB not
containing the branch:
    keep the counter at its current value
Else if the uBTB did not make a correct commit time prediction:
    increment the uBTB misprediction counter
Else:
    maintain the current uBTB misprediction counter value
```

It is understood that the above is merely one illustrative example to which the disclosed subject matter is not limited.

An example set of rules for updating the mBTB misprediction rate counter 144 is given below.

```
If 256 branches have committed:
    clear the mBTB misprediction counter
Else if the mBTB misprediction counter saturates at its maximum value:
    keep the counter at its maximum value
Else if the branch direction predicted by the sign of the bias weight used for
mBTB prediction disagrees with the final prediction made by the mBTB predictor:
    increment the mBTB misprediction counter
Else:
    main the current mBTB misprediction counter value
```

It is understood that the above is merely one illustrative example to which the disclosed subject matter is not limited.

In various embodiments, the test may not merely be that the uBTB 114 has a lower misprediction rate than the mBTB 104, but that it has a sufficiently low misprediction rate on its own. For example, in one embodiment, the uBTB 114 may only be enabled if (ignoring the confidence counters 132 and 142) the number of uBTB misprediction is lower than 6 MPK, or if the uBTB misprediction counter 134 is less than half of the mBTB misprediction counter 144 and less than 16 MPK.

An example set of rules for updating the mBTB misprediction rate counter 144 is given below. "MPKB" is mispredictions per thousand (kilo) branches.

```
If (uBTBCtr >= mBTBCtr) AND ((uBTB MPKB < 2*mBTBP MPKB) OR
uBTB MPKB <= 6) :
    Allow uBTB to lock on and make predictions (potentially improving
performance and saving power)
    Else:
        Prevent uBTB from locking on
        // heuristic believes uBTB predictions would reduce performance and waste
power
```

It is understood that the above is merely one illustrative example to which the disclosed subject matter is not limited.

Figure 3:
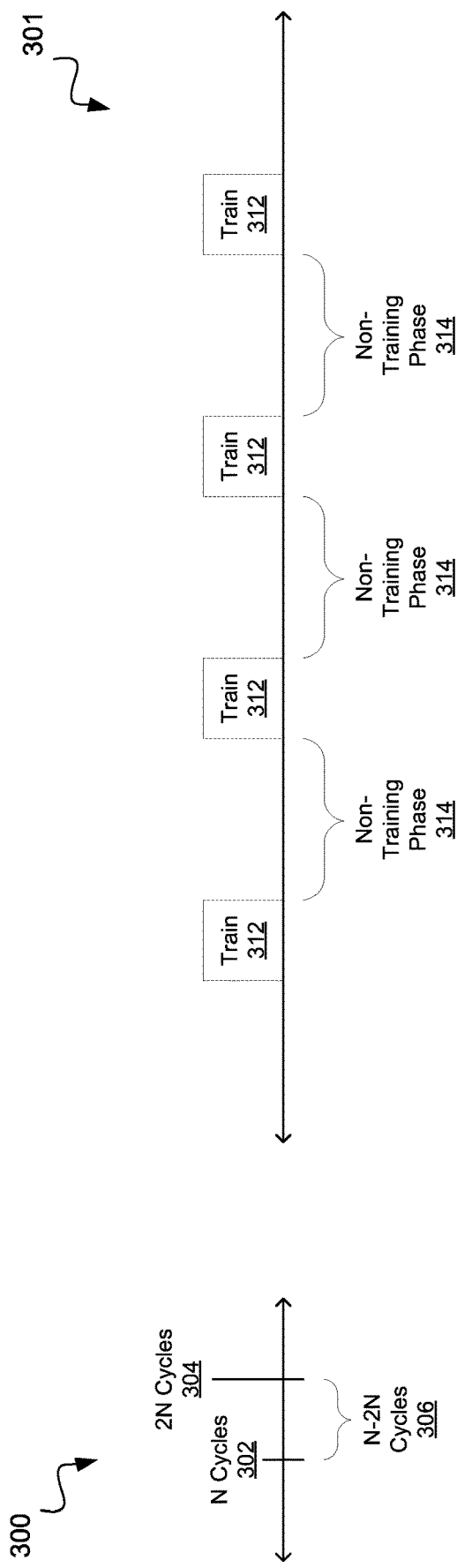
FIG. 3 are timing diagrams of example embodiments of techniques in accordance with the disclosed subject matter.

FIG. 3 shows timing diagrams of example embodiments of techniques in accordance with the disclosed subject matter. FIG. 3 shows two timing diagrams 300 and 301, which may be used in two different embodiments of the disclosed subject matter. In various embodiments one, both, or neither of these techniques described herein made be used with the system shown in FIG. 1, or another system.

Timing diagram 300 shows periodic sampling of the collected accuracy data, as described above. In such an embodiment, instead of continuously sampling the accuracy data, the system may periodically sample the accuracy data. In the illustrated embodiment, the sampling may occur every number (N) of clock cycles (e.g., 50 cycles, 5,000 cycles, etc.). In another embodiment, the sampling may occur based on another metric or the occurrence of an event. In some embodiments, the other metric may include a number of retired branches or instructions, a number of mis-predicts, a number of events, etc. In some embodiments, events may include the prediction/committing of a certain (e.g., flagged) instruction, or type of branch (e.g., loop, jump-on-zero, etc.), a threshold value reached, etc. It is understood that these are merely a few illustrative examples to which the disclosed subject matter is not limited.

As shown in diagram 300, at cycles or times 302 and 304, the enabling logic may sample or examine the contents of the accuracy data. In the meantime 306 (between times 302 and 304) that accuracy data may be collected, but no decision about it may be made.

In one embodiment, the technique shown in diagram 300 (or even that shown in diagram 301) may be employed to test the value or accuracy of various predictors (shown as predictors 115 and 105 of FIG. 1). In such an embodiment, one or more predictors may be enabled (or disabled) when an event or timer occurs (e.g., times 302 and 304). During the inter-period 306 or short testing/trading phase, the enabling logic may collect data on how well the uBTB or mBTB did at predicting with the tested changes made. The efficacy of the changes may be evaluated at the times 302 and 304.

In various embodiments, the efficacy of the altered predictors may include a measurement of the misprediction size per thousand branches/instructions, a percentage of time the uBTB had locked on to the kernel evaluated, etc. In some embodiments, based upon the effectiveness of the altered predictors, the enabling logic may enable or disable a given predictor, prediction weight, or prediction technique. This may save power for the system, as the circuit used to compute that prediction technique need not be powered up, or at least may not be switching.

Diagram 301 illustrates a training period technique that may be employed. In such an embodiment, the uBTB may be allowed to attempt to train, lock-on, or converge using a given kernel or set of instructions. In such an embodiment, the enabling logic may allow or enable the use of the prediction results from the uBTB during the training period 312, and then in the non-training period 314 either allow the uBTB to continue to be used or disable it, as described above.

In one such embodiment, the training period 312 may last for a relatively short percentage of time, such as for example 20,000-50,000 cycles out of every 100,000-1,000,000 cycles. It is understood this is merely one example to which the disclosed subject matter is not limited.

The enabling logic may maintain statistics based upon just the training period 312, or based upon both the long term uBTB predictions and then a separate one exclusively for the current training period 312. When the training period 312 is over, the enabling logic may evaluate the efficacy the uBTB during that period and decide if the uBTB will be enabled during the next non-training period 314.

In one embodiment, the enabling logic may enable the uBTB if it was accurately trained or locked-on more than a threshold amount during the training period 312. If the short term average during the training period 312 was below a threshold value, the uBTB may be disabled during the non-training period 314. Likewise, if the long term average over a number of training and non-training periods is below a threshold, the uBTB may be disabled. This process and evaluation may occur over and over, starting each new training period 312.

In one embodiment, the enabling logic may only collect data during the training period 312 and not during the non-training period 314. This may allow the enabling logic to power down or reduce power consumption during the non-training periods 314.

In various embodiments, either of these techniques may include non-uniform training periods or sampling times (e.g, long and short periods). In such an embodiment, the training periods may lengthen or shorten based upon the results of the training. In various embodiments, the training periods/sampling times may occur based upon a triggering event (e.g., a flag branch, type of branch, other processor events, etc.). In some embodiments, phase detection techniques may be employed to determine when the trading period/sampling time should occur.

Figure 2:
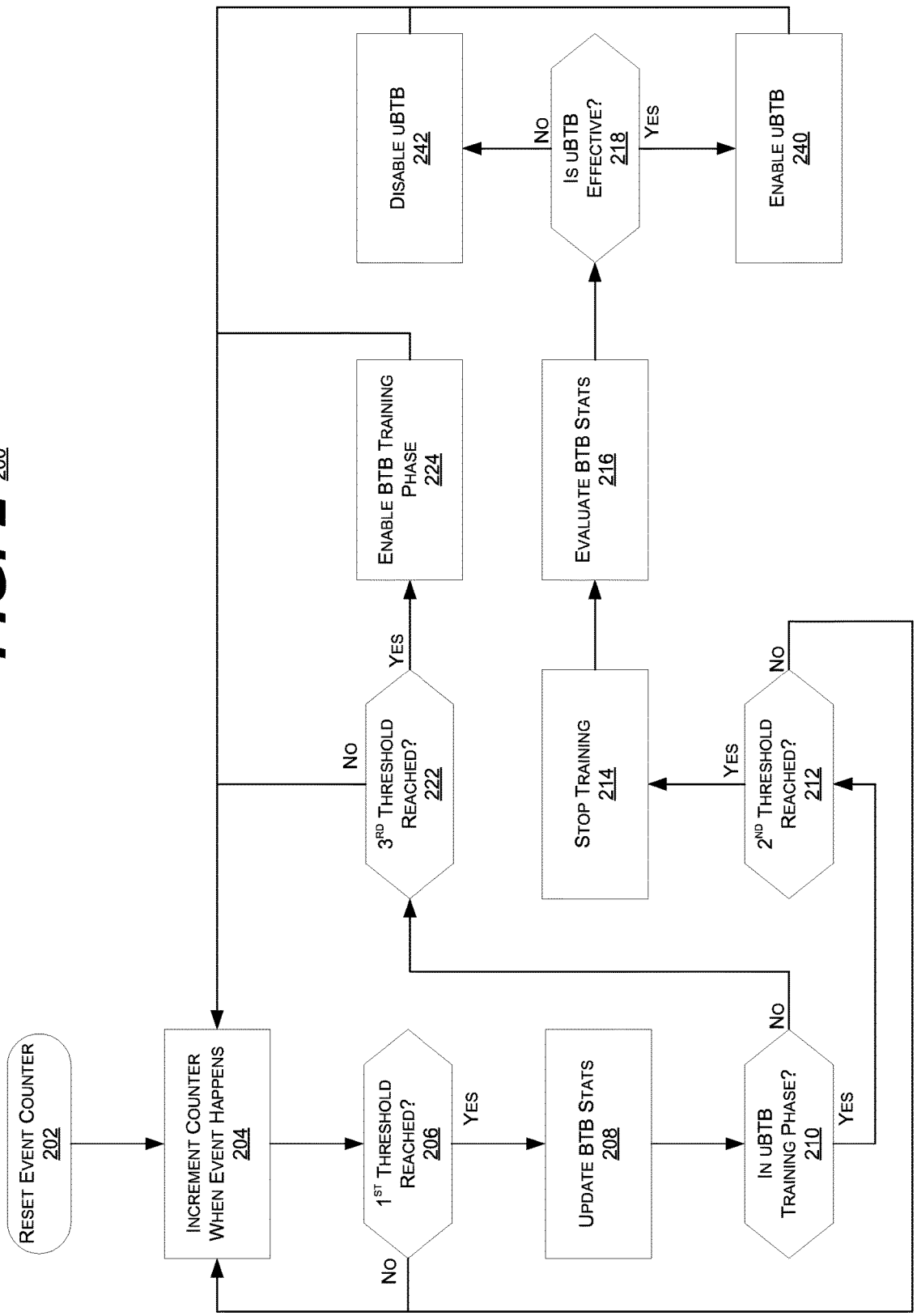
FIG. 2 is a flowchart of an example embodiment of a technique in accordance with the disclosed subject matter.

FIG. 2 is a flowchart of an example embodiment of a technique 200 in accordance with the disclosed subject matter. In various embodiments, the technique 200 may be used or produced by the systems such as those of FIG. 1, or 4. Furthermore, portions of technique 200 may be used or produced by the timing diagrams similar to that of FIG. 3. Although, it is understood that the above are merely a few illustrative examples to which the disclosed subject matter is not limited. It is understood that the disclosed subject matter is not limited to the ordering of or number of actions illustrated by technique 200.

Block 202 illustrates that, in one embodiment, an event counter may be reset to 0 or a known preset value. As described above, the event counter may register a number of events, possibly event events of multiple types. In the illustrated embodiment, the "events" are shown as clock cycles, but it is understood that is merely one example.

Block 204 illustrates that, in one embodiment, the event counter may be incremented (or decremented) every time an event occurs (e.g., a clock cycle). The event counter was described above. And events may include a logical combination (e.g, AND, OR, etc.) of a plurality of events.

Block 206 illustrates that, in one embodiment, this monitoring and incrementing may occur until a threshold value (e.g., zero, 50,000, etc.) is reached. In some embodiments, the threshold determination may actually be a modulus of a threshold value (e.g, every 50,000$^{th}$ cycle) as opposed to a fixed value. In another embodiment, when the sampling period is over, the counter may be reset. When the threshold value has been reached, the enabling or heuristic logic may begin processing other training phase or testing period.

Block 208 illustrates that, in one embodiment, the uBTB effectiveness or statistical counters may be updated. Likewise, if both short and long term counters or statistics are employed, as described above.

Block 210 illustrates that, in one embodiment, a determination may be made as to whether or not the system is already in the training period. If so, the system may continue the training period. If not, the system may start it.

Block 212 illustrates that, in one embodiment, if the system is in a training mode, the system may determine if the system should exit training mode and evaluate the results. In such an embodiment this decision may be based upon whether a second threshold has been met. In various embodiments, the second threshold may be multiple of the first threshold (e.g., Y*N), a different modulus of a threshold (e.g., for non-resetting counters), or a second event. It is understood these are merely, a few illustrative examples to which the disclosed subject matter is not limited.

Block 214 illustrates that, in one embodiment, if the second threshold is met the training period may be stopped. In various embodiments, this may include setting a flag or bit that indicates the status of training mode. If trading mode has not ended, the technique 200 may return to Block 204.

Block 216 illustrates that the collected statistics may be evaluated, as described above. As described, this may include short term statistics from the trading period, and in some embodiments, long term statistics.

Block 218 illustrates that, in one embodiment, a decision may be made whether to enable or disable the uBTB during the non-training period, as described above. In one embodiment this decision may be based upon the collected statistics.

Blocks 240 and 242 show that the heuristic or enabling logic may enable (Block 240) or disable (Block 242) the uBTB during the non-training period, as described above. In some embodiments, the event counter may be reset (Block 202) after the end of the training period. In another embodiment, the counter may not be reset (returning to Block 204) but the thresholds may be based upon multiples of values or individual events.

Block 222 illustrates that, in one embodiment, if the system is not in a training mode, the system may determine if the system should enter training mode. In such an embodiment this decision may be based upon whether a third threshold has been met. In various embodiments, the second threshold may be multiple of the first or second threshold (e.g., Z*N), a different modulus of a threshold (e.g., for non-resetting counters), or another event. It is understood these are merely a few illustrative examples to which the disclosed subject matter is not limited.

Block 224 illustrates that, in one embodiment, if training mode should be entered, then any needed flags or bits may be set. The uBTB may be enabled for the testing/training period, as described above. The technique 200 may then either return to Block 202 or 204, depending upon the embodiment.

In such an embodiment, the uBTB may be enabled during the testing/training period, and during the non-training period by the heuristic or enabling logic, as described above.

Figure 4:
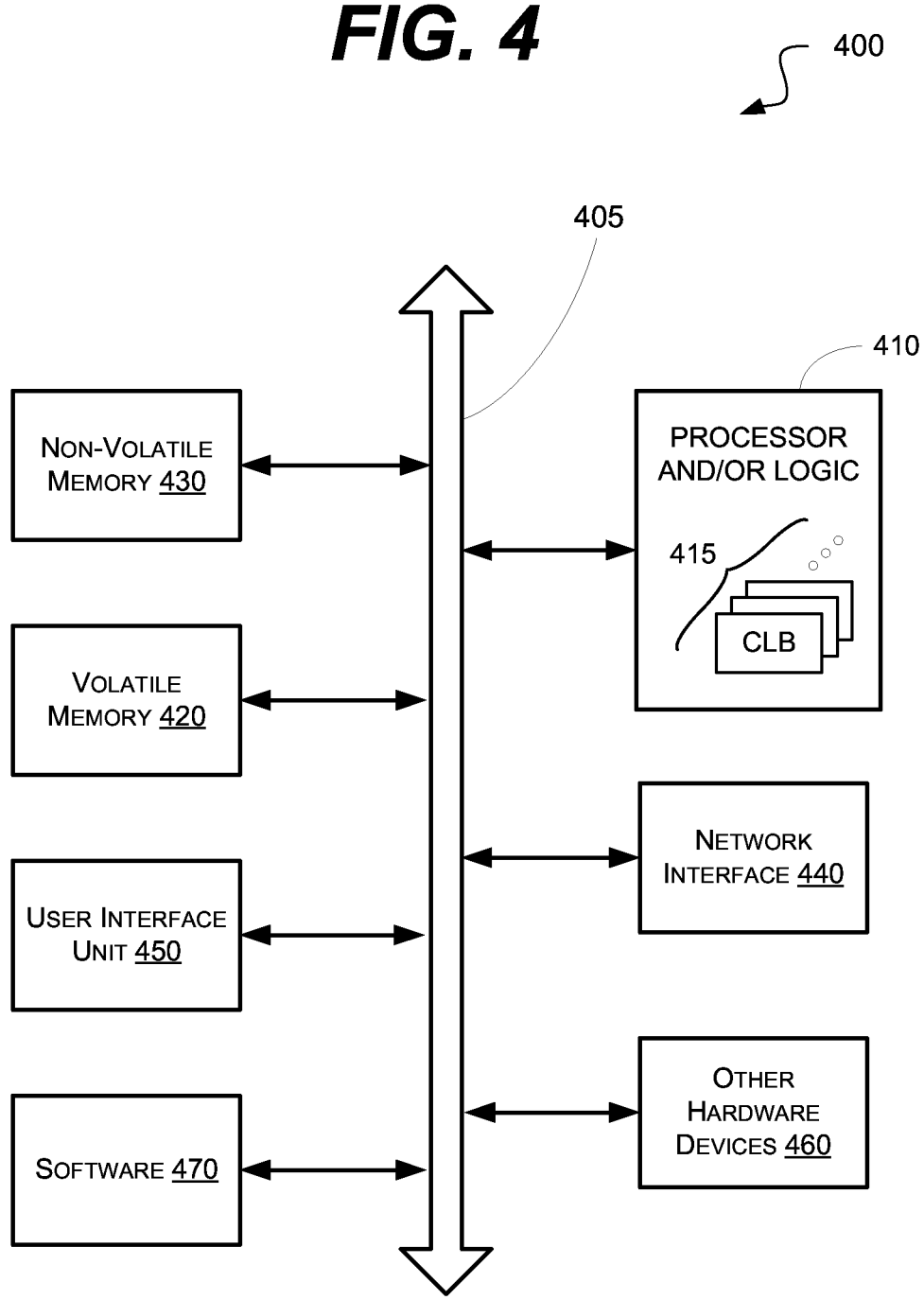
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a main-branch target buffer (BTB);
a micro-BTB separate from and smaller than the main-BTB, and configured to produce prediction information associated with a branching instruction;
a micro-BTB confidence counter configured to measure a correctness of the prediction information produced by the micro-BTB;
a micro-B TB misprediction rate counter configured to measure a rate of mispredictions produced by the micro-BTB; and
a micro-BTB enablement circuit configured to enable a usage of the micro-BTB's prediction information, based, at least in part, upon the values of the micro-BTB confidence counter and the micro-BTB misprediction rate counter;
wherein both the micro-BTB confidence counter and the micro-BTB misprediction rate counter are updated in response to a commitment of a branch instruction.

2. The apparatus of claim 1, wherein the micro-BTB enablement circuit is configured compare the values of the micro-BTB confidence counter and the micro-BTB misprediction rate counter against respective threshold values.

3. The apparatus of claim 2, wherein the respective threshold value for the micro-BTB confidence counter is a value of a main-BTB confidence counter; and
wherein the respective threshold value for the micro-BTB misprediction rate counter is a value of a main-BTB misprediction rate counter.

4. The apparatus of claim 1, wherein the micro-BTB enablement circuit is configured to enable a usage of the micro-BTB's prediction information if the micro-BTB confidence counter and the micro-BTB misprediction rate counter indicate that the micro-BTB is likely to be a better predictor than the main-BTB.

5. The apparatus of claim 1, wherein the apparatus includes a hashed branch predictor circuit; and
wherein the micro-BTB confidence counter is configured to alter the value of the micro-BTB confidence counter based, at least in part, upon a confidence level of the hashed branch predictor circuit.

6. The apparatus of claim 1, wherein the apparatus is configured to only update the micro-BTB confidence counter and the micro-BTB misprediction rate counter during periodic sampling intervals.

7. The apparatus of claim 1, wherein the micro-BTB enablement circuit is configured to, in a first mode, enable the micro-BTB to generate prediction information, but disable the usage of the micro-BTB's prediction information; and
the micro-BTB enablement circuit is configured to, in a second mode, enable the micro-BTB to generate prediction information, and the usage of the micro-BTB's prediction information.

8. The apparatus of claim 1, wherein the micro-BTB enablement circuit is configured to the usage of the micro-BTB's prediction information during period training intervals.

9. An apparatus comprising:
a main-branch target buffer (BTB);
a micro-BTB separate from and smaller than the main-BTB, and configured to produce prediction information associated with a branching instruction;
a main-BTB confidence counter configured to measure a correctness of the prediction information produced by the main-BTB;
a main-BTB misprediction rate counter configured to measure a rate of mispredictions produced by the micro-BTB; and
a micro-BTB enablement circuit configured to enable a usage of the micro-BTB's prediction information, based, at least in part, upon the values of the main-BTB confidence counter and the main-BTB misprediction rate counter;
wherein both the main-BTB confidence counter and the main-BTB misprediction rate counter update in response to a commitment of a branch instruction.

10. The apparatus of claim 9, wherein the micro-BTB enablement circuit is configured compare the values of the main-BTB confidence counter and the main-BTB misprediction rate counter against respective threshold values.

11. The apparatus of claim 10, wherein the respective threshold value for the main-BTB confidence counter is a value of a micro-BTB confidence counter; and
wherein the respective threshold value for the main-BTB misprediction rate counter is a value of a micro-BTB misprediction rate counter.

12. The apparatus of claim 9, wherein the micro-BTB enablement circuit is configured to enable a usage of the micro-BTB's prediction information if the main-BTB confidence counter and the main-B TB misprediction rate counter indicate that the micro-B TB is likely to be a better predictor than the main-BTB.

13. The apparatus of claim 9, wherein the apparatus includes a hashed branch predictor circuit; and
wherein the main-BTB confidence counter is configured to alter the value of the main-BTB confidence counter based, at least in part, upon a confidence level of the hashed branch predictor circuit.

14. The apparatus of claim 9, wherein the apparatus is configured to only update the main-BTB confidence counter and the main-BTB misprediction rate counter during periodic sampling intervals.

15. The apparatus of claim 9, wherein the apparatus further comprises:
a micro-BTB confidence counter configured to measure a correctness of the prediction information produced by the micro-BTB; and
a micro-BTB misprediction rate counter configured to measure a rate of mispredictions produced by the micro-BTB.

16. The apparatus of claim 9, wherein a plurality of predictors is associated with the micro-BTB, and
wherein the micro-BTB enablement circuit is configured to enable or disable individual ones of the plurality of predictors based, at least in part, upon a sampling of the period.

17. A system comprising:
a front-end logic section configured to fetch and predict a series of instructions to be executed; and wherein the front-end logic section comprises:
a main-branch target buffer (BTB);
a micro-BTB separate from and smaller than the main-BTB, and configured to produce prediction information associated with a branching instruction; and
a heuristic logic circuit comprising a plurality of counters configured to measure the effectiveness of the main-BTB and the micro-BTB, and based, at least in part, upon the plurality of counters, determine whether to enable a usage of the micro-B TB's prediction information;

wherein the plurality of counters are updated, at least in part, in response to a commitment of a branch instruction.

18. The system of claim 17, wherein the heuristic logic circuit is configured to compare a prediction accuracy of the main-BTB versus the micro-BTB, and compare a moving misprediction rate of the main-BTB versus the micro-BTB.

* * * * *